United States Patent [19]

Helbers

[11] 3,875,566

[45] Apr. 1, 1975

[54] RESETTING FILAMENT-FORMING MEMORY SEMICONDUCTOR DEVICES WITH MULTIPLE RESET PULSES

[75] Inventor: Jan Helbers, Ann Arbor, Mich.

[73] Assignee: Energy Conversion Devices, Inc., Troy, Mich.

[22] Filed: Oct. 29, 1973

[21] Appl. No.: 410,412

[52] U.S. Cl. .............. 340/173 R, 307/238, 307/324, 340/173 NR

[51] Int. Cl. .............. G11c 7/00, G11c 11/34

[58] Field of Search .............. 340/173 R, 173 NR; 307/279, 238, 324

[56] References Cited

UNITED STATES PATENTS 3,629,863 12/1971 Neale .............. 340/173 R 3,699,543 10/1972 Neale .............. 340/173 R

*Primary Examiner*—Stuart N. Hecker

*Attorney, Agent, or Firm*—Wallenstein, Spangenberg, Hattis & Strampel

[57] ABSTRACT

A method of resetting a filament-type memory device including spaced electrodes between which extend a body of generally amorphous substantially non-conductive memory semiconductor material which, when a set voltage pulse in excess of a given threshold voltage value and duration is applied to said electrodes, has formed therein a crystalline low resistance filamentous path resettable into a generally amorphous condition by application of one or more reset voltage pulses. The resetting method comprises during each reset operation applying to said electrodes a burst of a large number of reset current pulses each of an amplitude which is only a small fraction of the amplitude necessary to heat substantially the entire filamentous path to a temperature in excess of the glass transition temperature but of sufficient temperature to heat small fractional portions thereof to such temperature, the spacing of said reset current pulses being sufficiently great to ensure rapid cooling of said filament portions in the interval between pulses to enable the same to return to their initial amorphous condition and to return all or a desired proportion of the filament to an amorphous condition after said burst of reset current pulse has terminated. The reset current pulses are preferably applied by a constant current source which, when the output voltage is limited to a voltage below the maximum threshold voltage value of the memory device, stabilizes the threshold voltage value at this level.

13 Claims, 8 Drawing Figures

RESETTING FILAMENT-FORMING MEMORY SEMICONDUCTOR DEVICES WITH MULTIPLE RESET PULSES

BACKGROUND OF THE INVENTION

The present invention relates to the resetting of memory devices of the type disclosed in U.S. Pat. No. 3,271,591 granted Sept. 6, 1966 to S. R. Ovshinsky.

In recent years, there has been developed a memory matrix utilizing the non-volatile resettable characteristic of these memory devices. Such a memory matrix has been integrated onto a silicon semiconductor substrate as disclosed in U.S. Pat. No. 3,699,543 granted Oct. 17, 1972 to Ronald G. Neale. As disclosed in the latter patent, the matrix is formed within and on a semiconductor substrate, such as a silicon chip, which is doped to form spaced, parallel X or Y axis conductor-forming regions within the body. The substrate is further doped to form isolating rectifier or transistor elements for each active crossover point. The rectifier or transistor elements have one or more terminals exposed through openings in an outer insulating layer on the substrate. The Y or X axis conductors of the matrix are formed by spaced parallel bands of conductive material deposited on the insulation covered semiconductor substrate. The memory matrix further includes a deposit memory device including a thin film of amorphous memory semiconductor material (e.g., 1.5 microns in thickness) on the substrate adjacent each active cross-over point of matrix. Each film of memory semiconductor material is connected between the associated Y or X axis band of conductive material in series with the isolating rectifier.

The preferred memory semiconductor materials are tellurium based chalcogenide glass materials which have the general formula:

$Ge_ATe_BX_CY_D$ where:

A=5 to 60 atomic percent

B=30 to 95 atomic percent

C=0 to 10 atomic percent when X is Antimony (Sb) or Bismuth (Bi)

or

C=0 to 40 atomic percent when X is Arsenic (As)

D=0 to 10 atomic percent when Y is Sulphur (S)

or

D=0 to 20 atomic percent when Y is Selenium (Se).

A preferred composition is $Ge_{15}Te_{81}Sb_2S_2$

Each of the memory devices used in the memory matrix referred to is a two-terminal bistable device where the film of memory semiconductor material is capable of being triggered (set) from a stable high resistance initially amorphous condition into a stable low resistance condition when a set voltage pulse of a relatively long duration (e.g., 1–100 milliseconds or more) applied to spaced portions of this layer exceeds a given threshold voltage value. Such a voltage pulse causes set current to flow in a small filament (generally under 10 microns in diameter) which current is believed to heat the semiconductor material above its glass transition temperature where sufficient heat accumulates under the relatively long duration to cause a slow cooling of the material which crystallizes the material in the filament. Set current pulses are commonly in the range of from about 2 milliamps to about 15 milliamps. The magnitude of the set current pulse is determined by the degree to which the amplitude of the set voltage pulse exceeds the threshold voltage value of the memory device and the circuit resistance involved. The crystallized low resistance filament remains indefinitely, even when the applied voltage and current are removed, until reset to its initial amorphous high resistance condition as by the feeding of a high current short duration reset current pulse therethrough. Such a reset current pulse generally has a value of from about 100–200 milliamps and a duration of about 10 microseconds or less. Such a high current reset pulse is believed to heat the entire filament and portions of the semiconductor material beyond the limits of the filament to a critical temperature above the glass transition temperature of the material. When a reset pulse is terminated, the material quickly cools and returns to a generally amorphous state.

The heat generated by a reset current pulse is a function of both the geometry of the memory device and the size of the crystalline filament formed by the set current pulse. A relatively small filament, which is produced by relatively low amplitude set current pulse, produces a greater amount of heating for a given reset current pulse than does a relatively large filament which is produced by a relatively high set current pulse. To develop sufficient heat in a relatively large filament to reach the critical temperature for reset purposes was heretofore believed to require a relatively large reset current pulse. For a typical memory device manufactured by Energy Conversion Devices, Inc. of Troy, Michigan, a 2.5 millisecond set current pulse of 7 ½ milliamps requires about a 150 milliamp reset current pulse to produce sufficient heat substantially to heat the entire filament to a temperature above the glass transition temperature where termination thereof will reset substantially the entire filament to its amorphous maximum threshold voltage value and resistance condition. Since there is a possibility that such a reset current pulse will not completely reset the entire filament to an amorphous state (possibly because the heating of the centermost portions of the crystalline filament will cool more slowly than the outermost portions thereof), it has been suggested to feed a few additional reset current pulses in succession during each resetting operation to ensure substantially the complete resetting of the crystalline filament to its original amorphous state where it has a maximum resistance and threshold voltage value state. It has heretofore been proposed to provide a resetting operation where the number of high current reset pulses applied during a resetting operation is controlled by a circuit which measures the threshold voltage value or resistance of the memory device being reset, and if the memory device has a lower than maximum threshold voltage value or resistance an additional similar current reset pulse is applied to the memory device. This process is repeated until the memory device is reset to a point where a maximum threshold voltage value or resistance is reached. Such a method of resetting a memory device requires added circuitry and operates with high reset current pulses which were believed to heat substantially the entire initially crystalline filament above the glass transition temperature.

The use of multiple reset pulses to effect a partial setting of a memory device is suggested in U.S. Pat. No. 3,530,441 granted to S. R. Ovshinsky in the environment of an adaptive memory device which is character ized by a very gradual increase in resistance with reset energy pulse content, unlike a memory device of the type exemplified by the compositions given above characterized by a very sharp increase in reset resistance with reset energy pulse content. Moreover, this patent suggests the use of high reset current pulses of the order of magnitude of 100 milliamps of a much shorter than normal duration.

The cost and compactness of a memory matrix including a doped semiconductor substrate upon which rectifiers or transistors are incorporated therein depend, in part, on the number of such devices per unit area which can be incorporated in the substrate and on the packing density of the deposited film memory devices formed on the substrate. The minimum area for the doped rectifiers and transistors and memory devices is determined, in part, by masking limitations. However, the current carrying capabilities are greater for the deposited film memory devices than the doped rectifiers and transistors in the substrate. The smaller the area occupied by the doped rectifiers and transistors formed in the silicon chip substrate the lower the current rating thereof, and thus it is desirable to minimize the magnitude of the current flowing through the various circuits of the memory matrix. The use of reset current pulses of the order of magnitude of from 100–200 milliamps has placed severe limitations in the minimum size permitted for doped rectifiers and transistors referred to. A rectifier or transistor having a size of from 1 to 4 square millimeters has a current limitation which is such a small fraction of the 100–200 milliamp reset current pulses previously believed to be necessary to effect any appreciable resetting action in a deposited film memory device of the type described. The maximum threshold voltage values of memory devices of the type described have heretfore been a function of the ambient temperature conditions under which they are operated, the thickness of the memory semiconductor films involved and the particular composition and set voltage history of the devices. Using the manufacturing and operating techniques of the prior art, even with close control over the film thicknesses of the semiconductor films, it is practically impossible to obtain near identical maximum threshold voltage values in the memory devices. A set voltage is selected which is much greater than any expected maximum threshold voltage values of the memory devices considering the variation in ambient temperature conditions involved. (Threshold voltage values of memory devices decrease with increase in ambient temperature and increase with decrease in ambient temperature.)

A readout operation on the voltage memory matrix to determine whether a memory device at a selected cross-over point is in a low or high resistance condition involves the feeding of a voltage below the treshold voltage value across the associated X and Y axis conductors which is insufficient to trigger the memory device involved when in a high resistance condition to a low resistance condition and of a polarity to cause current flow in the low impedance direction of the associated isolating element, and detecting the resulting current or voltage condition to determine if the interrogated memory device is in a high or low resistance condition. The read current pulse which flows when a memory device is in a low resistance condition is of a value below the current which creates any significant reset action.

SUMMARY OF THE INVENTION

In accordance with the present invention, it was discovered that filament reset action in memory devices of the type exemplified by those disclosed in U.S. Pat. No. 3,271,591 is achievable with a reset current pulse level of a small fraction of the magnitude previously thought necessary to achieve any resetting action. Thus, it was discovered that reset current pulses having a magnitude of as little as 15 milliamps can heat portions of the crystalline filament of a memory material sufficiently to effect a significant resetting action, and that a near complete resetting operation can be efficiently achieved in a relatively short period of time by utilizing a large number of such low amplitude reset current pulses spaced relatively close together. For example, a near complete resetting operation was achieved by at least about 10–20, 15 milliamp reset current pulses, each about 1 microsecond in duration and spaced about 10 microseconds, where the memory device was about a 1.5 micron thick film of a memory material having the preferred composition $Ge_{15}Te_{81}Sb_2S_2$ previously set by a 7.5 milliamp, 2.5 millisecond set current pulse.

A low current reset current pulse fed to such a memory device is believed to produce a current of only sufficient magnitude to heat a small fraction of the entire crystalline filament of a set memory device above the glass transition temperature. The crystalline filament of a composition like that disclosed above comprises a large number of individual tellurium crystallites which engae one another at various points. The tellurium crystallites have a negative thermal coefficient of resistance so that the resistance thereof decreases with increase in temperature.

In accordance with one theory, each low reset current pulse flows in a path much smaller than the filament diameter, the formation of the path being reinforced because of the reduced resistance thereof caused by the heat generated by the initial current flow therein. Since each reset current pulse heats only a small fraction of the material in the entire filament to a temperature above the glass transition temperature, a large number of reset current pulses are needed in order substantiall to completely reset the crystalline filament to an amorphous condition. It is believed that all portions of each reset current path except perhaps the portion near the outer extremities thereof are heated above the glass transition temperature of the memory material. It has also been theorized that each small reset current pulse initially heats to a temperature above the glass transition temperature only those portions of the path near the points of contact of the crystallites. Subsequent small current pulses will heat other limited regions of the same and different paths to such a temperature until substantially all regions of the filaments are reset to an generally amorphous state in that some widely spaced nonresettable crystallites remain which establish a somewhat lower path resistance than other previously unset regions of the semiconductor material so subsequent set current pulses will flow through the original filament region.

While in accordance with the invention, pulses of from about 100 nano seconds to about 10 microseconds are considered feasible for reset current pulse durations, about a one microsecond pulse duration was found to be the most satisfactory for the purposes of the invention. The spacing of the reset current pulses is important to the extent that if the spacing is too close together (e.g., much under 2 microseconds), most points in the crystalline filament which are heated in excess of the glass transition temperature will not have a chance to cool sufficiently, so that successive pulses will have an accumulating effect which causes a bulk heating of the memory semiconductor, wherein the reset current pulses will not be effective in converting the original crystalline regions heated to a temperature in excess of the glass transition temperature to an amorphous state, to effect a partial resetting of the filament.

If the spacing between the reset current pulses exceeds about 10 microseconds, the efficiency of the resetting operation is unduly comprised, since then the material will completely cool to an ambient temperature state between successive pulses and it will take a much longer period of time to effect a complete resetting operation than is normally desirable. It was found that with reset current pulses of a magnitude of about 15 milliamps spaced apart about 10 microseconds, the crystalline filament of the memory device is progressively reset to its original amorphous condition under conditions where the regions of the filament being used are alternately driven between a desired temperature above the glass transition temperature and some lower temperature substantially in excess of room temperature, so that a complete reset operation can be achieved in about a few milliseconds or less.

With the discovery that a resetting action can be achieved by a reset current pulse as small as 15 milliamps, it becomes important to limit the current pulse which flows during a readout operation of a memory device (which desirably uses short duration read pulses to provide a fast readout) to a value lower than a value which will cause any appreciable reset action. It was found that one milliamp read pulse had no appreciable resetting effect on the crystalline filament of the exemplary memory devices being discussed. The amplitude of a read current pulse can be increased somewhat above this value, but is is desirably no greater than about 2.5 milliamps for thin films of memory semiconductor material.

Feeding of successive reset current pulses through a filament progressively to reset the same causes the resistance and the threshold voltage value of that filament progressively to increase during the resetting operation to a maximum value, at which point the filament is said to be completely reset. The feeding of reset current pulses of near identical amplitude through such a filament being progressively reset requires a constant reset current pulse source, which is a source which automatically adjusts the output voltage thereof to a value which produces a given fixed amplitude current reset pulse provided its maximum output voltage level capability is not exceeded. Such constant current sources are well known in the art. Thus, when the impedance of the circuit being fed by a constant current source exceeds the level for which the constant current source can maintain a constant current, the voltage output of the source is at its upper limit. If the threshold voltage value of the memory devices involved exceeds this limit, then the constant current source cannot produce any further current of a value to raise the temperature to a critical value above the glass transition temperature where reset action occurs. Thus, to ensure the complete resetting of a filament of a memory device with such a constant current source requires a constant current source whose maximum voltage capability is at or in excess of the highest threshold voltage value expected for the memory device. In the case of a memory matrix, the maximum output voltage of such a constant current source can be selected to be at least somewhat greater than any maximum threshold voltage value expected for any of the memory devices in the matrix involved. In such case, the number of reset current pulses generated in each reset operation is automatically sufficient to reset the filament involved.

In accordance with another aspect of the present invention, a very useful result is achieved if the maximum voltage which can be generated by the constant current source supplying the reset current pulses is a value below the maximum threshold voltage value of all of the memory devices involved. Thus, for example, if the maximum threshold voltage values of all the memory devices in a matrix fall above 12 volts, the selection of a constant current reset current pulse which has a maximum output voltage of 10 volts automatically results in the establishment of a threshold voltage value of exactly this limiting voltage of 10 volts, because reset current pulses automatically cease when the threshold voltage value of the memory device is raised to this value where it offers an impedance which prevents any further flow of reset current therethrough. Thus, with this technique, the actual thickness of the semiconductor film which forms each memory device need not be carefully controlled, provided it is of at least a thickness to provide a maximum threshold voltage value in excess of the limiting voltage of the constant reset current source.

DESCRIPTION OF PREFERRED EMBODIMENT OF INVENTION

Figure 1:
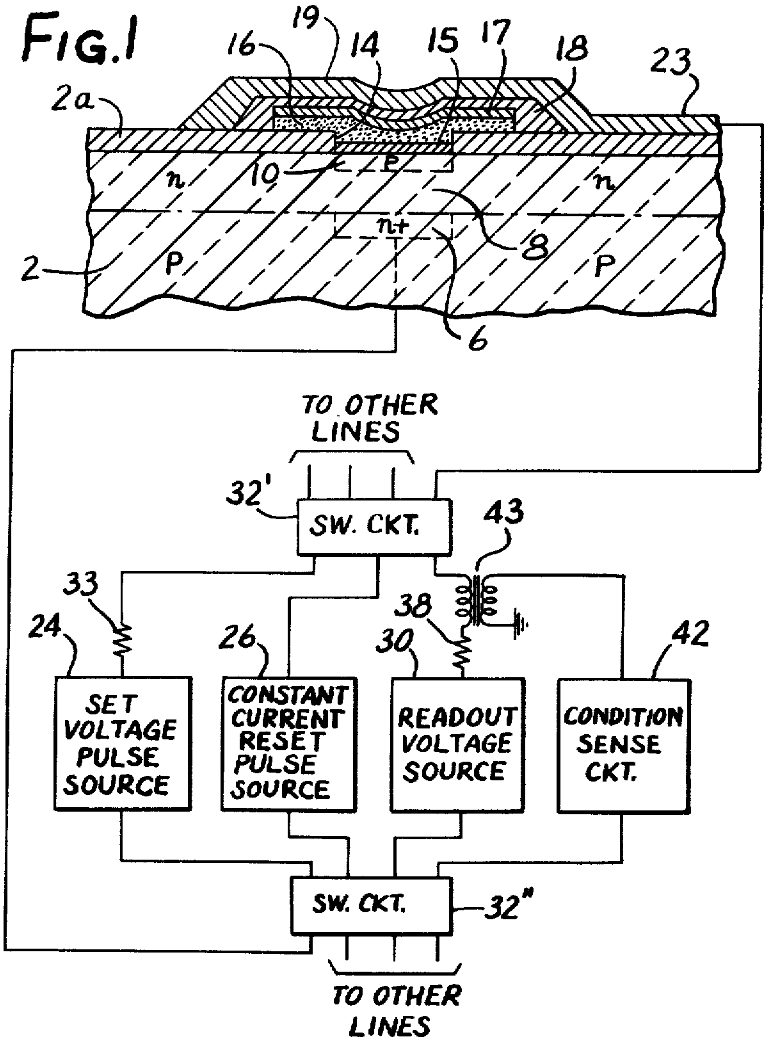
FIG. 1 illustrates a sectional view through a memory device and a doped silicon chip substrate on which it is formed, together with various switching means and voltage sources for setting, resetting and reading out the resistance conditions of the memory device, all forming part of an $x$–$y$ memory matrix system.

FIG. 1 shows a memory device 1 integrated upon a silicon chip substrate generally indicated by reference numeral 2. The memory device 1 may form part of an $x$–$y$ memory matrix, such as disclosed in U.S. Pat. No. 3,699,543, and, in such case, the $x$ or $y$ axis conductors are formed in the body of the silicon chip substrate 2. One of these $x$ or $y$ axis conductors is indicated by a $n$ plus region 6 in the substrate 2 which region is immediately beneath an n region 8, in turn, immediately beneath a *p* region 10. The p-n regions 10 and 8 of the silicon chip 2 form a rectifier which, together with the memory device 1, are connected between one of the crossover points of the *x–y* matrix involved.

The silicon chip 2 has thereon a film 2*a* of silicon dioxide. This silicon dioxide film is provided with openings like 14 each of which initially expose the semiconductor material of the silicon chip above which point a memory device 1 is to be located. A suitable electrode layer 15 is selectively deposited over each exposed portion of the silicon chip, which layer may be palladium silicide or other suitable electrode-forming material. A memory semiconductor layer 16 of each memory device 1 is preferably sputter deposited over the entire insulating film 2*a* and is then etched away through a photo-resist mask to leave separated areas thereof centered over the openings 14 in the insulating film 2*a* where the memory semiconductor material extends into the openings 14. The memory semiconductor layer 16, as previously indicated, is most preferably a chalcogenide material having as major elements thereof tellurium and germanium, although the actual composition of the memory semiconductor material useful for the memory semiconductor layer 16 can vary widely in accordance with the broader aspects of the invention.

Figure 5:
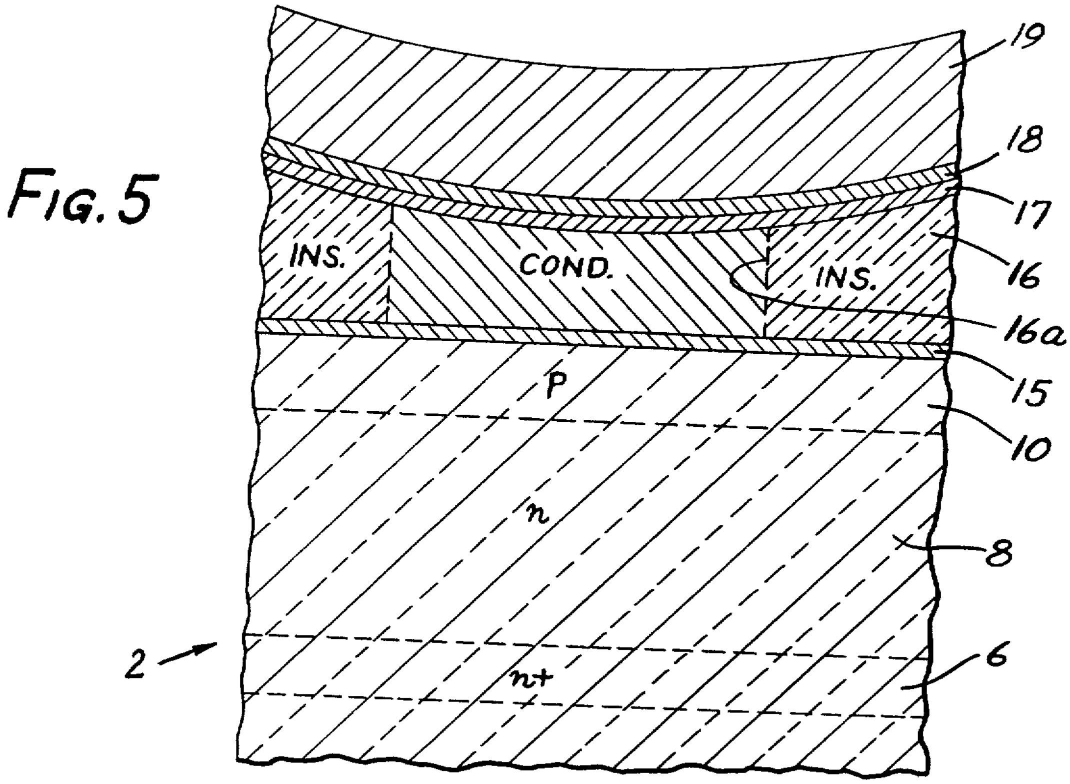
FIG. 5 is an enlarged fragmentary view through the memory device and substrate of FIG. 1.

Threshold stabilization can be obtained in a relatively few numbers of set and reset cycles by forming in the interface region between a refractory metal barrier-forming electrode layer 18 like amorphous molybdenum and the memory semiconductor layer 16 an enriched region of the element which would normally migrate towards the adjacent electrode, namely in the tellurium-germanium composition involved an enriched area of tellurium. (The barrier-forming electrode layer 18 prevents migration of metal ions from the highly conductive electrode layer 19 of aluminum or the like into the memory semiconductor layer 16.) By an enriched region of tellurium is meant tellurium in much greater concentration than such tellurium is found in the semiconductor composition involved. This can be best achieved by sputter depositing a layer 17 of crystalline tellurium upon the entire outer surface of the memory semiconductor layer 16. Over this tellurium layer 17 is shown deposited an inner barrier-forming refractory metal layer 18 and an outer highly conductive metal electrode layer 19 of aluminum or the like. With the application of a tellurium layer 17 of sufficient thickness (a 0.7 micron thickness layer of such tellurium was satisfactory in one exemplary embodiment of the invention where the memory semiconductor layer 16 was 1.5 microns thick), the threshold voltage of the memory device 1 stabilized after about 10–20 set-reset cycles. The layer 17 most advantageously extends opposite substantially the entire outer surface area of the memory semiconductor layer 16 and the inner surface area of the barrier-forming refractory metal layer 18 so the tellurium region will be located at the termination of a filamentous current path 16*a* (FIG. 5) in the memory semiconductor layer 16 no matter where it is formed, and so it makes an extensive low resistance contact with the refractory metal layer 18. The tellurium layer 17 lowers the overall resistance of the memory device 1 in the conductive state thereof.

The outer electrode layer 19 of aluminum or the like of each memory device in the matrix connects to a deposited row or column conductor 23 deposited on the insulating layer 2*a*. Each *n* plus region like 6 of the substrate 2 form a column or row conductor of the matrix extending at right angles to the row or column conductor 23. Each row or column conductor like 23 of the matrix to which the outer electrode layer 19 of each memory device 1 is connected is coupled to one of the output terminals of a switching circuit 32′ having separate inputs extending respectively directly or indirectly to one of the respective output terminals of set, reset and readout voltage sources 24, 26 and 30. The other terminals of these voltage sources may be connected to separate inputs of a switching circuit 32″ whose outputs are connected to the various *n* plus regions like 16 of the matrix. The switching circuits 32′ and 32″ effectively connect one of the selected voltage sources 24, 26 or 30 to a selected row and column conductor of the matrix, to apply the voltage involved to the memory device connected at the crossover point of the selected row and column conductors. (In the alternative each of the set, reset and readout voltage sources 24, 26 and 30 can be replaced by separate voltage sources which produce voltages which are switched separately to all or selected row and column lines so all memory devices in a given row or column can be simultaneously set, reset or interrogated for a readout operation.)

In the connection between the switching circuit 32′ and the positive terminal of the set voltage pulse is shown a current limiting resistor 33 and in the connection between the switching circuit 32′ and the positive terminal of the readout voltage source 30 is shown a voltage divider resistor 38. The reset voltage source 26 may be a constant current source.

Figure 2A:
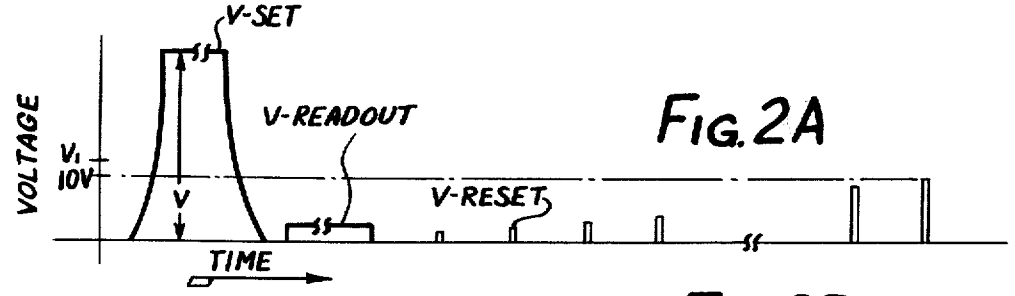
FIGS. 2A and 2B illustrate the open circuit applied voltage waveform and resulting in circuit current flow conditions of the memory device of FIG. 1 under the set, reset and low resistance readout modes of operation of the memory device.
Figure 2B:
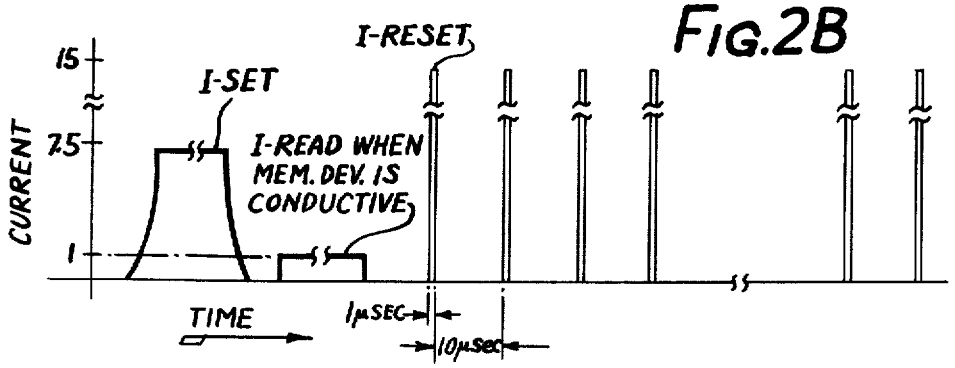

Exemplary outputs of the voltage sources 24, 26 and 30 are illustrated in FIG. 2A and the exemplary currents produced thereby are illustrated in FIG. 2B below the corresponding voltage pulses involved. As there-shown, the voltage output of the set voltage source 24 will be in excess of the threshold voltage value of the memory device 1, whereas the amplitude of the output of the readout voltage source 30 must be less than the threshold voltage value of the memory device 1. For a set voltage pulse to be most effective in setting the memory device 1 from an initial high resistance to a low resistance condition, a generally long duration pulse waveform is required having a duration in milliseconds as previously described. A readout pulse can, if desired, be a wide or short pulse. However, the reset pulse is generally such a very short duration pulse measured in microseconds rather than milliseconds that it cannot set the memory device even if its amplitude exceeded the threshold voltage value of the memory device. (It is assumed that the high resistance condition of the memory device is so much higher than any impedance in series therewith that one can assume that substantially the entire applied voltage appears thereacross.)

In the reset state of the memory device 1, the memory semiconductor layer 16 thereof is an amorphous material, and acts substantially as an insulator so that the memory device is in a very high resistance condition. However, when a set voltage pulse is applied across its electrodes which exceeds the threshold voltage value of the memory device, current starts to flow in a filamentous path 16*a* (FIG. 5) in the amorphous semiconductor layer 16 thereof which path is heated above its glass transition temperature. The filamentous path 16*a* is generally under 10 microns in diameter, the exact diameter thereof depending upon the value of the current flow involved. The current resulting from the application of the set voltage pulse source is generally under 10 milliamps. Upon termination of the set voltage pulse because of what is believed to be the bulk heating of the filamentous path 16*a* and the surrounding material due to the relatively long duration current pulse and the nature of the crystallizable amorphous composition of the layer 16, such as the germanium-tellurium compositions described, one or more of the composition elements, mainly tellurium in the exemplary composition previously described, crystallizes in the filamentous path. This crystallized material provides a low resistance current path so that upon subsequent application of the readout voltage from the source 30 current will readily flow through the filamentous path 16 *a* of the memory device 1 and the voltage across the electrodes of the memory device becomes a factor of the relative value of the memory device resistance and the voltage divider resistor 38 in series therewith.

The high or low resistance condition of the selected memory device 1 can be determined in a number of ways, such as by measuring the voltage across the memory device 1 where the readout voltage source 30 is a constant current source, or, as illustrated, by providing a current transformer 43 or the like in the line extending from the readout voltage source 30 and providing a condition sensing circuit 43 for sensing the magnitude of the voltage generated in the transformer output. If the selected memory device 1 is in its set low resistance condition, the condition sensing circuit 42 will sense a relatively low voltage and when the selected memory device 1 is in its reset high resistance condition it will sense a relatively large voltage. The current which generally flows through the filamentous path 16*a* of the selected memory device 1 during the application of a readout voltage pulse is of a very modest level, such as 1 milliamp.

Figures 3, 4:
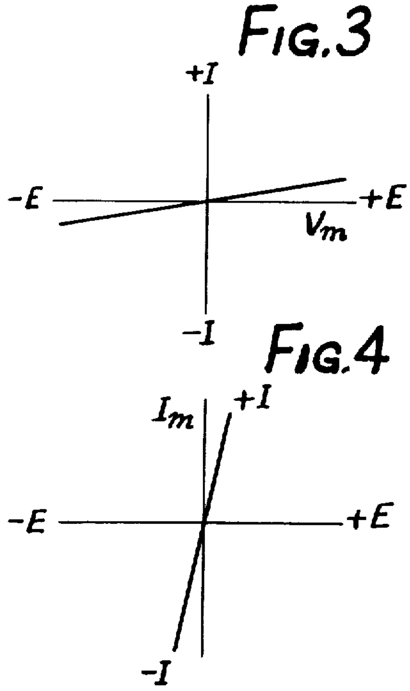
FIGS. 3 and 4 respectively illustrate the voltage current characteristics of the memory device of FIG. 1 respectively in the high and low resistance conditions thereof.

FIG. 3 shows the variation in current flow through the selected memory device 1 with the variation in applied voltage when the memory device is in its relatively high resistance reset condition, and FIG. 4 illustrates the variation in current with the variation in voltage applied across the device electrodes when the memory device is in its relatively low resistance set condition.

Each resetting of the filamentous path 16*a* of the memory semiconductor layer 16 from its low back to its high resistance condition is effected by the feeding of a number (e.g. at least about 10–20) low amplitude, short duration current reset pulses shown in FIG. 2B as described in the introductory part of this specification. These reset current pulses are generated by the reset voltage source 26 which is most advantageously a source of constant current pulses of the desired low amplitude and duration, such as 15 milliamps and 1 microsecond. In such case, each reset current pulse is believed to heat only relatively limited parts of the crystalline filamentous path 16*a* to a temperature which dissipates and returns the same to an amorphous state.

The constant current reset voltage source 26 produces an output voltage within limits which maintain a given current flow therethrough. The limiting output voltage of the constant current source is less than the maximum threshold voltage value of all the memory devices in the matrix, so the threshold voltage values of all memory devices is automatically stabilized at the identical value because, assuming the voltage source 26 is a free running voltage pulse generating source, reset current pulses will continue to flow in each memory device being reset until the threshold voltage thereof reaches or slightly exceeds the maximum output voltage of the constant current reset pulse source, where the voltage output therein no longer produces a desired current flow in the memory device involved. Thus, with such a reset system, the thickness of the semiconductor films used in the memory device need not be made to close tolerances, provided a thickness is used which is at least a value which will produce a threshold voltage value greater than the maximum voltage output of the constant current reset voltage source 26.

Figure 6:
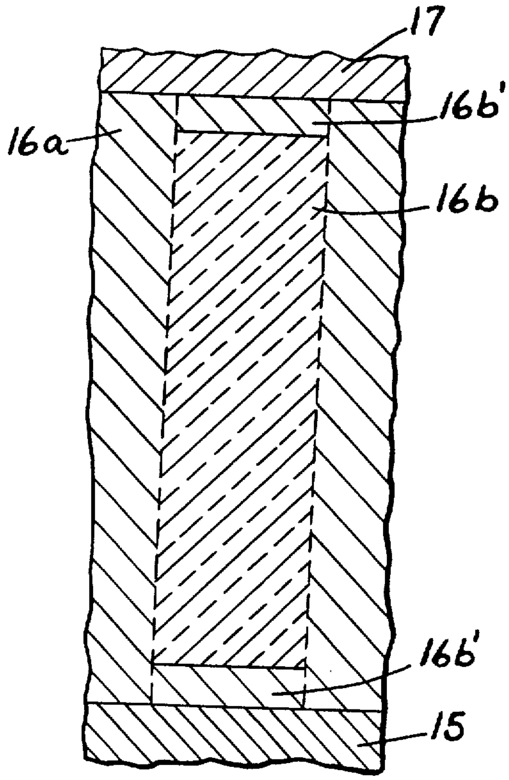
FIGS. 6 and 7 represent a microscopic view of a portion of a crystalline filament of the memory device of FIG. 1 respectively before it has been reset and when it is partially reset by a single low current reset pulse.
Figure 7:
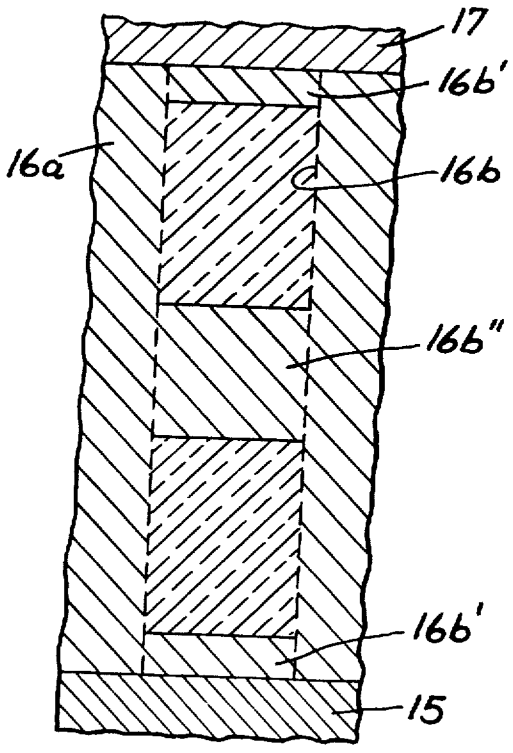

Referring now to FIG. 6, as previously indicated, in accordance with one theory of the invention, each small reset current pulse seeks a path of least resistance and, because of the small value of the reset current pulse involved, occupies only a narrow path 16*b* relative to the total diameter of the crystalline filament 16*a*. It is believed that this current heats most of the crystallites of the filament (except perhaps the largest ones and those in regions 16*a'* near the heat sink-forming electrodes 15-17) above the glass transition temperature, where the material returns to an amorphous state. Termination of the short duration reset current pulse results in rapid cooling of the path and leaves most of the path 16*a'* (except perhaps the slower cooling center portion 16*b''*) in an amorphous condition. Since the path 16*b* is a high resistance path after it is reset, subsequent reset current pulses will seek other paths within the crystalline filament 16*a* to reset the same.

As previously indicated, in accordance with another theory of the invention, each small reset current pulse will heat to a glass transition temperature only the points of highest resistance in the current path, which initially is at the interfaces between contiguous crystallites. On the assumption that the heat generated at these high resistance points does not quickly disseminate throughout the filament, the high resistance points are heated to a temperature above the glass transition temperature, and assume an amorphous state upon termination of the reset current pulse. In either event, as previously indicated, a reset current pulse of a magnitude which was not thought of sufficient value to heat any portion of the crystalline filament to a temperature in excess of the glass transition temperature effects a resetting action of a small fraction of the filament 16*a*.

The effective use of small reset current pulses and relatively low voltage set pulses with deposited film memory devices permits the maximum packing density thereof on a silicon chip substrate where the doped read-in and readout circuit and isolating device-forming areas thereof occupy minimum areas of the silicon chip.

It should be understood that numerous modifications may be made in the most preferred forms of the invention described without deviating from the broader aspects of the invention.

I claim:

1. A method of resetting a number of filament type memory devices each including spaced electrodes between which extend a body of generally amorphous non-conductive memory semiconductor material which when a set voltage pulse in excess of a threshold voltage value and duration is applied to said electrodes has formed therein a crystalline low resistance filament resettable into a generally amorphous condition by application of reset voltage pulses producing reset current pulses through said filament which progressively partially dissipates the crystalline filament and returns the same to a generally amorphous state, said progressive partial dissipation of the crystalline filament causing said partially reset filament to have a progressively increasing resistance and threshold voltage value reaching a maximum threshold voltage value when substantially the entire filament is converted to its amorphous condition, said method comprising: applying to each of said memory devices during each resetting operation a number of reset voltage pulses having at least ultimately a given maximum predetermined magnitude substantially in excess of the lowest threshold voltage values of the partially reset filaments of all of said memory devices and no higher than the lowest maximum threshold voltage values of said memory devices involved, and which reset voltage pulses produce said reset current pulses which partially dissipate said crystalline filament of said memory devices as long as the magnitude of the reset voltage pulses remains in excess of the threshold voltage value of the memory device being reset, whereby the threshold voltage values of all of said memory devices are adjusted to substantially the same value independently of differences in the maximum threshold voltage values thereof.

2. In combination, a filament type memory device including spaced electrodes between which extend a body of generally amorphous non-conductive memory semiconductor material which, when a set voltage pulse in excess of a threshold voltage value and duration is applied to said electrodes, has formed therein a crystalline low resistance filament resettable into a generally amorphous condition by application of reset voltage pulses producing reset current pulses through said filament which progressively partially dissipates the crystalline filament causing said partially reset filament to have a progressively increasing resistance and threshold voltage value reaching a maximum threshold voltage value when substantially the entire crystalline filament involved is returned to its initial amorphous condition; and resetting means for resetting said memory device comprising a source of reset voltage pulses selectively connectable to said electrodes of said memory device for applying thereto for each reset operation a number of said reset voltage pulses respectively producing said reset current pulses which progressively dissipate the crystalline filament, the maximum value of said source of reset voltage pulses at least ultimately reaching a given predetermined value below the maximum threshold voltage value of the memory device, wherein the threshold voltage value of the memory device is automatically stabilized at said maximum voltage output of said source of reset voltage pulses.

3. The combination of claim 2 wherein there are a number of said filament type memory devices the maximum threshold voltage values of the various memory devices being somewhat different; and said resetting means being selectively connectable to said electrodes of said memory devices for applying thereto for each reset operation a number of said reset voltage pulses respectively producing said reset current pulses which progressively dissipates the crystalline filament which reset voltage pulses at least ultimately reaches a given predetermined value no greater than the maximum threshold voltage value of the memory device having the smallest maximum threshold voltage value, wherein the threshold voltage values of the memory devices are automatically stabilized at the maximum voltage output of said source of reset voltage pulses.

4. The combination of claim 3 wherein said source of reset voltage pulses is a constant current source of such pulses which automatically produces reset voltage pulses of the necessary amplitude to produce reset current pulses of a fixed magnitude and duration, and whose maximum voltage output is limited to said predetermined value below the maximum threshold voltage value of the memory device having a minimum maximum threshold voltage value.

5. In combination, a filament-type memory device including spaced electrodes between which extend a body of generally amorphous non-conductive memory semiconductor material which, when a set voltage pulse in excess of a threshold voltage value and duration is applied to said electrode has formed therein a crystalline low resistance filament resettable into a generally amorphous condition by application of one or more reset voltage pulses producing reset current pulses through said filament of a given amplitude which heat the same to a temperature which dissipates substantially the entire crystalline filament and are of a duration which is so short that upon termination of each reset current pulse the filament will be cooled to leave at least portions of the filament in a substantially amorphous condition; and a source of reset voltage for resetting said path to its initial amorphous condition, said source being selectively connectable to said electrodes for applying thereto for each reset operation a burst of reset current pulses each of an amplitude no greater than about 50 milliamps so as to convert only fractional portions of the crystalline filament to a substantially amorphous condition, the duration of and spacing between said pulses being sufficiently great to enable sufficient cooling of the portion of the filament affected thereby in the interval between such pulses.

6. The combination of claim 5 wherein said memory semiconductor material has the general formula:

$Ge_A Te_B X_C Y_D$ where:

A=5 to 60 atomic percent
B=30 to 95 atomic percent
C=0 to 10 atomic percent when $x$ is Antimony (Sb) or Bismuth (Bi)
or
C=0 to 40 atomic percent when $x$ is Arsenic (As)
D=0 to 10 atomic percent when $y$ is Sulphur (S)
or
D=0 to 20 atomic percent when $y$ is Selenium (Se).

7. The combination of claim 5 wherein said memory semiconductor material is one exhibiting a sharp increase in reset filament resistance with reset current energy.

8. A method of resetting a filament-type memory device including spaced electrodes between which extend a body of generally amorphous nonconductive memory semiconductor material which, when a set voltage pulse in excess of a threshold voltage value and duration is applied to said electrodes has formed therein a crystalline low resistance filament resettable into a generally amorphous condition by application of one or a few reset voltage pulses producing reset current pulses through said filament which heat the same to a temperature which dissipates substantially the entire crystalline filament and are of a duration which is so short that upon termination thereof the filament will be cooled to leave at least portions of the filament in a substantially amorphous condition, said method comprising: during each reset operation applying to said electrodes a burst of at least about 10 reset current pulses each of an amplitude which is much less than one half the amplitude necessary to heat substantially the entire filamentous path to a crystalline filament dissipating temperature but of sufficient value to heat small fractional portions thereof to such temperature, the spacing of said reset current pulses being sufficiently great to ensure sufficient cooling of said filament portions in the interval between pulses to enable the same to return to their initial amorphous condition.

9. The method of claim 8 wherein said memory semiconductor material has the general formula:

$Ge_A Te_B X_C Y_D$ where:

A=5 to 60 atomic percent

B=30 to 95 atomic percent

C=0 to 10 atomic percent when *x* is Antimony (Sb) or Bismuth (Bi)

or

C=0 to 40 atomic percent when *x* is Arsenic (As)

D=0 to 10 atomic percent when *Y* is Sulphur (S)

or

D=0 to 20 atomic percent when *Y* is Selenium (Se).

10. A method of resetting a filament-type memory device including spaced electrodes between which extend a body of generally amorphous non-conductive memory semiconductor material which, when a set voltage pulse in excess of a threshold voltage value and duration is applied to said electrodes, has formed therein a crystalline low resistance filament resettable into a generally amorphous condition by application of one or a few reset voltage pulses producing reset current pulses through said filament which heat the same to a temperature which dissipates substantially the entire crystalline filament and are of a duration which is so short that upon termination thereof the filament will be cooled to leave at least portions of the filament in a substantially amorphous condition, said method comprising: during each reset operation applying to said electrodes a burst of reset current pulses each of an amplitude much less than 100 milliamps so as to heat only fractional portions thereof to a crystalline filament dissipating temperature, the spacing of said reset current pulses being sufficiently great to ensure sufficient cooling of said filament portions in the interval between pulses to enable the same to return to their intitial amorphous condition.

11. The method of claim 10 wherein each of said reset current pulses in each burst of reset current pulses is substantially under 50 milliamps.

12. The method of claim 10 wherein the number of pulses in each burst of pulses is in excess of about 50 pulses.

13. The method of claim 10 wherein the amplitude of each of said reset current pulses in each burst of reset current pulses is no greater than about 15 milliamps.

* * * * *